Patented June 1, 1937

2,082,500

UNITED STATES PATENT OFFICE 2,082,500

CATALYTIC POLYMERIZATION

Ward E. Kuentzel, Whiting, Ind., assignor to Standard Oil Company, Chicago, Ill., a corporation of Indiana No Drawing. Application December 17, 1934, Serial No. 757,903

12 Claims. (Cl. 196—10)

This invention relates to an improvement in the manufacture of liquid hydrocarbons of gasoline boiling range from unsaturated or olefinic gases.

It is well know that aluminum chloride per se is an active catalyst for the polymerization of gaseous unsaturated hydrocarbons to liquid products but such polymerization reactions in the presence of aluminum chloride per se are usually violent in character and highly uncontrollable on account of the exothermic character of the reaction. Furthermore, their activity tends to decline very rapidly and they usually tend towards the formation of liquid products of viscous characteristics and of much higher boiling range than the desired light products of gasoline boiling range. It is also known to the art that aluminum chloride may be combined with certain other metallic halides to form stable salts which are active catalysts for the polymerization of gaseous olefins, sodium chloro-aluminate being an example of this type of catalyst. Other proposed catalysts of this type are calcium chloro-aluminate, barium chloro-aluminate, cuprous chloro-aluminate, and silver chloro-aluminate.

I have found that certain other double salts of aluminum halides with certain metallic halides possess unusual advantages as compared to the catalysts of this type previously known to the art.

Specifically, I have found that lithium chloro-aluminate ($LiCl.AlCl_3$) is especially active as a catalyst for polymerization of gaseous olefins. Using a feed gas containing 33.5% propylene by volume, the remainder being propane, with lithium chloro-aluminate as a catalyst at a pressure of 750 lbs./sq. in., temperature of 258° F. and space velocity or feed rate of 4000 cu. ft. free gas per cu. ft. of free catalyst space per hour, a conversion of the entering olefins of 89.7% to liquid products was obtained and the catalyst did not show sensibly diminished activity after a run of four hours duration. As compared to this, sodium chloro-aluminate at the same temperature, pressure and with the same feed gas gave a conversion to liquid products of only 49.5% of the entering olefins.

I have found that certain other double salts of aluminum halides with other metallic halides are also particularly active. These compounds may be characterized as compounds of aluminum halide with a halide of the first metallic element of the various groups of the periodic system including lithium, beryllium, titanium, vanadium, chromium, manganese, iron, cobalt and nickel. As another specific example of this type of catalyst, the following results have been obtained with a catalyst comprising ferric chloro-aluminate ($FeCl_3.AlCl_3$). Using as feed gas a mixture of 30% propylene and 70% propane at 750 lbs. pressure, and 4640 space velocity at 257° F. (comparable with the above data for sodium chloro-aluminate and lithium chloro-aluminate) a conversion of entering olefins to liquid products of 73.9% was obtained. This same catalyst at 129° F. and a feed rate of 8600 space velocity, other conditions being the same, gave a conversion of entering olefins to liquids of 92.4%, thus showing the great activity of this catalyst as compared with previously known catalysts.

I have also found that magnesium chloro-aluminate, although not derived from one of the first metallic elements in one of the groups of the periodic system, nevertheless gives advantageous results as a catalyst for conversion of gaseous olefins. Using a feed gas comprising 32.5% propylene and the balance propane at 750 lbs. pressure and 161° F. a catalyst comprising $MgCl_2.2AlCl_3$ gave a conversion of 72% of entering gaseous olefins to liquid products, the feed rate being equivalent to a space velocity of 5250.

It is highly important that my catalysts be substantially anhydrous. Although I have referred particularly to combinations of metallic chlorides with aluminum chloride I may use other aluminum halides and other metallic halides in combination therewith, providing they form stable double salts.

The gases which may be treated by my process include, the various unsaturated or olefinic gases such as butylene, propylene, and isobutylene. My catalysts have relatively little effect on ethylene although they will polymerize it to some extent when propylene or other higher olefin is also present. The olefinic gases are usually treated in admixture with each other and with various saturated or inert gases. For instance, ethane, methane, propane and butane and certain amounts of hydrogen may be present in the mixtures. The concentration of the olefinic gases passed into the catalyst chamber may range from 15 to 70% but preferably from 25% to 50% by volume.

No special apparatus or method of preparation of the catalyst is necessary for carrying out my process. The catalyst chamber is ordinarily charged with a solid catalyst distributed on some suitable inert carrier material and the catalyst chamber may be provided with internal cooling means. On the other hand, I may also operate with the catalyst in molten form and bubble the feed gas therethrough.

I have found that my improved catalysts may be used in the temperature range of 100–550° F. and with pressures of 200–3000 lbs./sq. in. and time of contact (expressed as rate of flow) of 400–25,800 cu. ft. of free feed gas (i. e. gas measured at 60° F. and atmospheric pressure) per cu. ft. of free catalyst space per hour. I prefer, however, to operate in the range of 150–450° F. at pressures of 500–1000 lbs./sq. in. and with rates of flow of 800–6700 cu. ft. of free feed gas/cu. ft. free catalyst space per hour. The optimum conditions will vary with the different catalysts and can readily be determined by those skilled in the art.

The foregoing being a full and complete description of my invention, it is understood that I am not limited thereto except as expressed in the claims as follows:

I claim:

1. A process for the polymerization of olefinic gases having a molecular weight greater than that of ethylene to form polymerization products within the gasoline boiling point range, comprising contacting said gases with a double salt of aluminum chloride with a chloride of the first metallic element of a group of the periodic system at a temperature substantially within the range 100° F. to 550° F., at a pressure substantially within the range 200 lbs./sq. in. to 3000 lbs./sq. in. and at a rate of flow substantially within the range 400 to 25,800 cu. ft. of free feed gas per cubic foot of free catalyst space per hour.

2. A process for the polymerization of olefinic gases having a molecular weight greater than that of ethylene to form polymerization products within the gasoline boiling point range, comprising contacting said gases with a double salt of aluminum chloride with a chloride of the first metallic element of a group of the periodic system at a temperature substantially within the range 150° F. to 450° F., at a pressure substantially within the range 500 lbs./sq. in. to 750 lbs./sq. in. and at a rate of flow substantially within the range 800 to 5000 cu. ft. of free feed gas/cu. ft. of free catalyst space/hour.

3. A process for the polymerization of olefinic gases having a molecular weight greater than that of ethylene to form polymerization products within the gasoline boiling point range, comprising contacting said gases with magnesium chloroaluminate at a temperature substantially within the range 100° F. to 550° F., at a pressure substantially within the range 200 lbs./sq. in. to 3000 lbs./sq. in., and a rate of flow substantially within the range 400 to 25,800 cu. ft. of free feed gas per cubic foot of free catalyst space per hour.

4. A process for the polymerization of olefinic gases containing olefinic hydrocarbons having a molecular weight greater than that of ethylene to form polymerization products within the gasoline boiling point range, comprising contacting said gases with lithium chloro-aluminate at a temperature substantially within the range of 100° F. to 550° F., at a pressure substantially within the range of 200 lbs. per square inch to 3000 lbs. per square inch and at a rate of flow substantially within the range of 400–25,800 cu. ft. of free feed gas per cu. ft. of free catalyst space per hour.

5. A process for the polymerization of olefinic gases containing olefinic hydrocarbons having a molecular weight greater than that of ethylene to form polymerization product within the gasoline boiling point range, comprising contacting said gases with ferric chloro-aluminate at a temperature substantially within the range of 100° F. to 550° F., at a pressure substantially within the range of 200 lbs. per square inch to 3000 lbs. per square inch and at a rate of flow substantially within the range of 400–25,800 cu. ft. of free feed gas per cu. ft. of free catalyst space per hour.

6. A process for the polymerization of olefinic gases containing olefinic hydrocarbons having a molecular weight greater than that of ethylene to form polymerization products within the gasoline boiling point range, comprising contacting said gases with lithium chloro-aluminate at a temperature substantially within the range of 150° F. to 450° F., at a pressure substantially within the range of 500 lbs. per square inch to 750 lbs. per square inch and at a rate of flow substantially within the range of 800–5,000 cu. ft. of free feed gas per cu. ft. of free catalyst per hour.

7. A process for the polymerization of olefinic gases containing olefinic hydrocarbons having a molecular weight greater than that of ethylene to form polymerization products within the gasoline boiling point range, comprising contacting said gases with a catalyst selected from the group consisting of a double salt of aluminum chloride with a chloride of the first metallic element of a group of the periodic system and magnesium at a temperature substantially within the range of 100° F. to 550° F., at a pressure substantially within the range of 200 lbs. per square inch to 3000 lbs. per square inch and at a rate of flow substantially within the range of 400–25,800 cu. ft. of free feed gas per cu. ft. of free catalyst space per hour.

8. A process for the polymerization of olefinic gases containing olefinic hydrocarbons having a molecular weight greater than that of ethylene to form polymerization products within the gasoline boiling point range, comprising contacting said gases with a double salt catalyst selected from the group consisting of lithium chloro-aluminate and magnesium chloro-aluminate at a temperature substantially within the range of 150° F. to 450° F., at a pressure substantially within the range of 200 lbs. per square inch to 3000 lbs. per square inch and at a rate of flow substantially within the range of 800–6,700 cu. ft. of free feed gas per cu. ft. of free catalyst space per hour.

9. In a process for the conversion of an admixture of normally gaseous hydrocarbons containing paraffins with at least two carbon atoms and olefins with at least three carbon atoms into liquid hydrocarbon motor fuel products, the steps comprising contacting said admixture of gases with lithium chloro-aluminate at a temperature substantially within the range of 150° F. to 550° F. and at a pressure substantially within the range of 200 to 3000 lbs. per square inch.

10. In a process for the conversion of an admixture of normally gaseous hydrocarbons containing paraffins with at least two carbon atoms and olefins with at least three carbon atoms into liquid hydrocarbon motor fuel products, the steps comprising contacting said admixture of gases with ferric chloro-aluminate at a temperature substantially within the range of 150° F. to 550° F. and at a pressure substantially within the range of 200 to 3000 lbs. per square inch.

11. In a process for the conversion of an admixture of normally gaseous hydrocarbons containing paraffins with at least two carbon atoms and olefins with at least three carbon atoms into liquid hydrocarbon motor fuel products, the steps comprising contacting said admixture of gases with magnesium chloro-aluminate at a temperature substantially within the range of 150° F. to 550° F. and at a pressure substantially within the range of 200 to 3,000 lbs. per square inch.

12. In a process for the conversion of an admixture of normally gaseous paraffins and olefins wherein each hydrocarbon contains at least two carbon atoms each into liquid hydrocarbon motor fuel products, the steps comprising contacting said admixture of gases with a double salt of aluminum chloride with a chloride of the first metallic element of a group of the periodic system at a temperature within the range of 150° F. to 550° F. and at a pressure substantially within the range of 200 to 3,000 lbs. per square inch.

WARD E. KUENTZEL.